(12) United States Patent
Yamane et al.

(10) Patent No.: US 10,589,358 B2
(45) Date of Patent: Mar. 17, 2020

(54) HYDRAULIC CHUCK DEVICE (71) Applicant: DMG MORI CO., LTD., Nara (JP)

(72) Inventors: Masahiro Yamane, Nara (JP);
Kimiyuki Nishimura, Nara (JP);
Masakazu Takayama, Nara (JP); Shun Michiura, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 15/474,053

(22) Filed: Mar. 30, 2017

(65) Prior Publication Data

US 2017/0291226 A1 Oct. 12, 2017

(30) Foreign Application Priority Data

Apr. 11, 2016 (JP) .................... 2016-078739

(51) Int. Cl.
*B23B 31/16* (2006.01)
*B23B 31/30* (2006.01)

(52) U.S. Cl.
CPC ...... *B23B 31/302* (2013.01); *B23B 31/16287* (2013.01); *B23B 2231/10* (2013.01);
(Continued)

(58) Field of Classification Search
CPC . B23B 31/16; B23B 31/16287; B23B 31/302; B23B 2231/26; B23B 2260/142;
(Continued)

(56) References Cited

U.S. PATENT DOCUMENTS 3,369,464 A * 2/1968 Blattry .................. B23B 31/302
137/102
4,536,000 A * 8/1985 Rohm .................. B23Q 1/0009
279/110

(Continued)

FOREIGN PATENT DOCUMENTS

DE          3937448 A1 * 4/1991 ........... B23B 31/302
DE    202005019887 U1    2/2006
(Continued)

OTHER PUBLICATIONS

Machine translation, Japan patent document, JP 09295208A, Yamaguchi N. et al., Nov. 18, 1997.*
(Continued)

*Primary Examiner* — Eric A. Gates
*Assistant Examiner* — Chwen-Wei Su
(74) *Attorney, Agent, or Firm* — Miller, Matthias & Hull LLP (57) ABSTRACT

A hydraulic chuck device includes a cylinder portion operated by pressure oil, a chuck opened and closed by operation of the cylinder portion, a pressure oil supply controlling pressure of pressure oil supplied to the cylinder portion, and a chuck controller controlling the pressure oil supply. When controlling the pressure oil supply to cause a jaw portion to perform a clamping operation, during movement of the jaw portion from an unclamping position to a preliminary position situated before a clamping position, the chuck controller supplies pressure oil set at a first pressure into a cylinder chamber for clamping to move the jaw portion quickly, and during movement of the jaw portion from the preliminary position to the clamping positon, the chuck controller supplies pressure oil set at a second pressure lower than the first pressure into the cylinder chamber for clamping to move the jaw portion slowly.

6 Claims, 4 Drawing Sheets (52) U.S. Cl.
CPC ..... *B23B 2231/26* (2013.01); *B23B 2260/128* (2013.01); *B23B 2260/142* (2013.01); *B23B 2270/025* (2013.01); *B23B 2270/32* (2013.01); *Y10T 279/21* (2015.01)

(58) Field of Classification Search
CPC .......... B23B 2260/128; B23B 2270/32; B23B 2270/025; Y10T 279/19; Y10T 279/21; Y10T 279/1208; Y10T 279/1291
See application file for complete search history.

(56) References Cited

U.S. PATENT DOCUMENTS

| | | | |
|---|---|---|---|
| 4,781,390 A | 11/1988 | Steinberger et al. | |
| 6,241,258 B1 | 6/2001 | Roussel | |
| 6,463,835 B1 * | 10/2002 | Segawa | B23B 31/16025 279/4.02 |
| 2008/0034956 A1 * | 2/2008 | Ochi | B23B 31/302 91/420 |
| 2011/0210523 A1 * | 9/2011 | Trocki | B23B 31/18 279/4.12 |
| 2012/0144967 A1 * | 6/2012 | Kim | B23B 23/00 82/148 |
| 2015/0013145 A1 | 1/2015 | Fujiwara et al. | |

FOREIGN PATENT DOCUMENTS

| | | | |
|---|---|---|---|
| JP | 62136302 A | * | 6/1987 |
| JP | 09295208 A | | 11/1997 |
| JP | 2004017193 A | | 1/2004 |
| JP | 2015016525 A | | 1/2015 |

OTHER PUBLICATIONS

European Search Report for related European Application No. 17165773.7; report dated Sep. 12, 2017.

* cited by examiner

HYDRAULIC CHUCK DEVICE

BACKGROUND

Field of the Disclosure

The present disclosure relates to a hydraulic chuck device attached to a lathe or the like.

Background of the Disclosure

A typical hydraulic chuck device includes a cylinder portion operated by working oil (pressure oil) set at a predetermined pressure, a chuck having a jaw portion, a pressure oil supply supplying pressure oil to the cylinder portion, and a chuck controller controlling the pressure oil supply.

The cylinder portion has a cylinder hole and a piston disposed in the cylinder hole, and the piston is operated by pressure oil that is selectively supplied into either one of two cylinder chambers formed on opposite sides of the piston. The piston is connected to the jaw portion of the chuck via an appropriate connecting member and the jaw portion is opened and closed by the operation of the piston. Further, under control by the chuck controller, the pressure oil supply switches the cylinder chamber to be supplied with pressure oil, thereby opening or closing the jaw portion.

Although a typical hydraulic chuck device has such a configuration, an improved hydraulic chuck device has been proposed, which is disclosed in Japanese Unexamined Patent Application Publication No. H9-295208.

This hydraulic chuck device includes data processing means; the data processing means previously stores and holds clamping force information for various workpieces as a database, and processes the clamping force information. The pressure oil supply includes a solenoid proportional control valve adjusting the pressure of the pressure oil, and the chuck controller receives inputs of clamping force determining elements for a particular workpiece, reads out particular clamping force information for the particular workpiece from the data processing means, and controls the solenoid proportional control valve so that the clamping force of the jaw portion becomes a target clamping force that is determined based on the particular clamping force information.

Accordingly, in the hydraulic chuck device disclosed in Japanese Unexamined Patent Application Publication No. H9-295208, when the type of the workpiece to be clamped is changed, inputting and setting clamping force determining elements for the new workpiece, for example, the material, shape, and the like of the workpiece, in the chuck controller causes the chuck controller to read out particular clamping force information for the particular workpiece from the database stored in the data processing means and control the solenoid proportional control valve so that the clamping force of the jaw portion becomes a target clamping force determined based on the particular clamping force information. Thus, the setting of the clamping force, which is necessary when the type of the workpiece is changed, can be carried out automatically and can be facilitated.

SUMMARY OF THE DISCLOSURE

Typically, the hydraulic chuck device having the above-described configuration is often used in a lathe, and a workpiece is clamped by the jaw portion with the chuck attached to a front end of a spindle of the lathe. The jaw portion is composed of a plurality of jaw bodies disposed radially with respect to an axis of the spindle, and in the case of clamping an outer periphery of a workpiece, the workpiece is clamped when the jaw bodies are closed, and the workpiece is unclamped when the jaw bodies are opened. Meanwhile, in the case of clamping an inner periphery of a workpiece, the workpiece is clamped when the jaw bodies are opened, and the workpiece is unclamped when the jaw bodies are closed.

Usually, in the unclamped state, an appropriate clearance is set between clamping surfaces of the jaw bodies and a clamped surface of the workpiece. Especially in an apparatus having a configuration in which a workpiece is automatically supplied by a loader or a robot, a large clearance is set to prevent the jaw bodies from interfering with the supplied workpiece. Further, the pressure of the pressure oil at the time of clamping and the pressure of the pressure oil at the time of unclamping are usually set at the same pressure, and the pressure of the pressure oil at the time of clamping is set as appropriate based on the rigidity and cutting force of the workpiece and the like. Therefore, in the case of a workpiece which has a low rigidity and therefore is likely to be subject to clamping distortion, the pressure of the pressure oil is set at a low pressure.

However, setting the pressure of the pressure oil at a low pressure as described above reduces the operation speed of the jaw bodies at the time of clamping and at the time of unclamping, which leads to a problem that attachment/ detachment of a workpiece to/from the chuck takes a longer time. In the field of machine tools such as a lathe, rationalization and cost reduction are always desired in all aspects; therefore, improvement is naturally desired also in the operation time of such a hydraulic chuck.

The present disclosure has been achieved in view of the above-described circumstances, and an object thereof is to provide a hydraulic chuck device which enables a shorter workpiece attachment/detachment time than those in conventional hydraulic chuck devices while keeping its workpiece clamping force in an appropriate state.

The present disclosure, for solving the above-described problem, relates to a hydraulic chuck device including:

a cylinder portion having a cylinder hole and a piston disposed in the cylinder hole, the piston being operated by pressure oil selectively supplied into either one of two cylinder chambers formed on opposite sides of the piston;

a chuck having a jaw portion connected to the piston, the jaw portion being opened and closed by operation of the piston;

a pressure oil supply switching the cylinder chamber to be supplied with pressure oil to open or close the jaw portion and controlling pressure of the pressure oil to be supplied; and a chuck controller controlling the pressure oil supply, the chuck controller being configured to, when controlling the pressure oil supply to supply pressure oil into the cylinder chamber for clamping for executing a clamping operation of moving the jaw portion from an unclamping position to a clamping position, during movement of the jaw portion from the unclamping position to a preliminary position situated before the clamping position, supply pressure oil set at a first pressure into the cylinder chamber for clamping so as to move the jaw portion at a high speed, and during movement of the jaw portion from the preliminary position to the clamping position, supply pressure oil set at a second pressure lower than the first pressure into the cylinder chamber for clamping so as to move the jaw portion at a low speed.

According to this hydraulic chuck device, under control by the chuck controller, pressure oil is selectively supplied into either one of the two cylinder chambers by the pressure oil supply, whereby the jaw portion is opened or closed and a workpiece is clamped by the jaw portion or unclamped. The jaw portion is typically composed of a plurality of jaw bodies, for example, two jaws, three jaws, or four jaws, and the jaw bodies are provided radially with respect to a center axis of the chuck and are opened and closed by operation of the piston.

Further, when controlling the pressure oil supply to supply pressure oil into the cylinder chamber for clamping for executing a clamping operation of moving the jaw portion (that is, the jaw bodies) from an unclamping position to a clamping position, during movement of the jaw portion from the unclamping position to a preliminary position situated before the clamping position, the chuck controller supplies pressure oil set at a first pressure into the cylinder chamber for clamping so as to move the jaw portion at a high speed. Thereafter, during movement of the jaw portion from the preliminary position to the clamping position, the chuck controller supplies pressure oil set at a second pressure lower than the first pressure into the cylinder chamber for clamping so as to move the jaw portion at a low speed.

Accordingly, in the hydraulic chuck device according to the present disclosure, when the jaw portion is caused to carry out the clamping operation, the jaw portion is moved at a high speed during its movement from the unclamping position to the preliminary position; therefore, the clamping operation can be executed quickly even when a large clearance is set between a clamping surface of the jaw portion (clamping surfaces of the jaw bodies) and a clamped surface of an object to be clamped (workpiece).

Note that, although, during movement of the jaw portion from the preliminary position to the clamping position, pressure oil set at the second pressure lower than the first pressure is supplied into the cylinder chamber for clamping and thereby the jaw portion is moved at a low speed, because the moving distance from the preliminary position to the clamping position can be set to be very small by situating the preliminary position as appropriate, the clamping operation as a whole can be executed quickly even though the moving speed of the jaw portion for movement from the preliminary position to the clamping position is reduced.

Further, in the case of a workpiece which has a low rigidity and therefore is likely to be subject to clamping distortion, occurrence of such clamping distortion can be prevented by setting the second pressure as appropriate.

Note that, when pressure oil is supplied into the cylinder chamber for unclamping for executing an unclamping operation of moving the jaw portion from the clamping position to the unclamping position, as a matter of course, it is preferred that pressure oil set at the first pressure is supplied into the cylinder chamber for unclamping so as to move the jaw portion at a high speed. In this manner, the unclamping operation can be executed quickly.

In the present disclosure, the hydraulic chuck device may further include a position detector detecting arrival of the jaw portion at the preliminary position;

the chuck controller may be configured to, when arrival of the jaw portion at the preliminary position is detected by the position detector, control the pressure oil supply to supply pressure oil set at the second pressure into the cylinder chamber for clamping. In this configuration, arrival of the jaw portion at the preliminary position can be directly detected by the position detector; therefore, arrival of the jaw portion at the preliminary position can be reliably detected.

In the present disclosure, the chuck controller may be configured to, when a predetermined time elapses after supply of pressure oil set at the first pressure into the cylinder chamber for clamping is started, determine that the jaw portion arrives at the preliminary position, and supply pressure oil set at the second pressure into the cylinder chamber for clamping. The jaw portion moves at a constant speed that depends on the pressure of the pressure oil supplied into the cylinder chamber; therefore, it is possible to determine that the jaw portion arrives at the preliminary position when a predetermined time elapses after supply of pressure oil set at the first pressure into the cylinder chamber for clamping is started.

Further, the chuck controller may be configured to, after the jaw portion arrives at the clamping position, control the pressure oil supply to supply pressure oil set at a third pressure set as a pressure for clamping into the cylinder chamber for clamping. In this configuration, adjusting the third pressure as appropriate allows an object to be clamped, i.e., a workpiece, to be clamped with a clamping force corresponding to the rigidity of the workpiece and the like, which prevents occurrence of clamping distortion on the workpiece. Further, setting the first pressure and the second pressure at pressures which are able to move the jaw portion as quickly as possible allows the clamping operation of the jaw portion to be executed quickly.

Further, the pressure oil supply may comprise a solenoid switching valve switching the cylinder chamber to be supplied with pressure oil, and a solenoid proportional pressure control valve controlling the pressure of the pressure oil to be supplied, and the chuck controller may be configured to control the solenoid switching valve to switch the cylinder chamber to be supplied with pressure oil, and control the solenoid proportional pressure control valve to control the pressure of the pressure oil to be supplied.

As described above, in the hydraulic chuck device according to the present disclosure, when the jaw portion is caused to carry out the clamping operation, during movement of the jaw portion form the unclamping position to the preliminary position, the jaw portion is moved at a high speed by supplying pressure oil set at a high pressure (first pressure) into the cylinder chamber for clamping; therefore, the clamping operation for clamping an object to be clamped (workpiece) can be executed quickly even when a large clearance is set between a clamping surface of the jaw portion (clamping surfaces of the jaw bodies) and a clamped surface of the workpiece.

Further, during movement of the jaw portion from the preliminary position to the clamping position, the jaw portion is moved at a low speed by supplying pressure oil set at a second pressure lower than the first pressure into the cylinder chamber for clamping; therefore, setting the second pressure as appropriate allows even a workpiece which has a low rigidity and therefore is likely to be subject to clamping distortion to be clamped without occurrence of such clamping distortion.

Further, in the configuration in which, after the jaw portion arrives at the clamping position, the workpiece is clamped using pressure oil set at a third pressure set as a pressure for clamping, adjusting the third pressure as appropriate can prevent occurrence of clamping distortion on the workpiece, and setting the first pressure and the second pressure at pressures which are able to move the jaw portion as quickly as possible allows the jaw portion to carry out the clamping operation more quickly.

DETAILED DESCRIPTION

Figure 1:
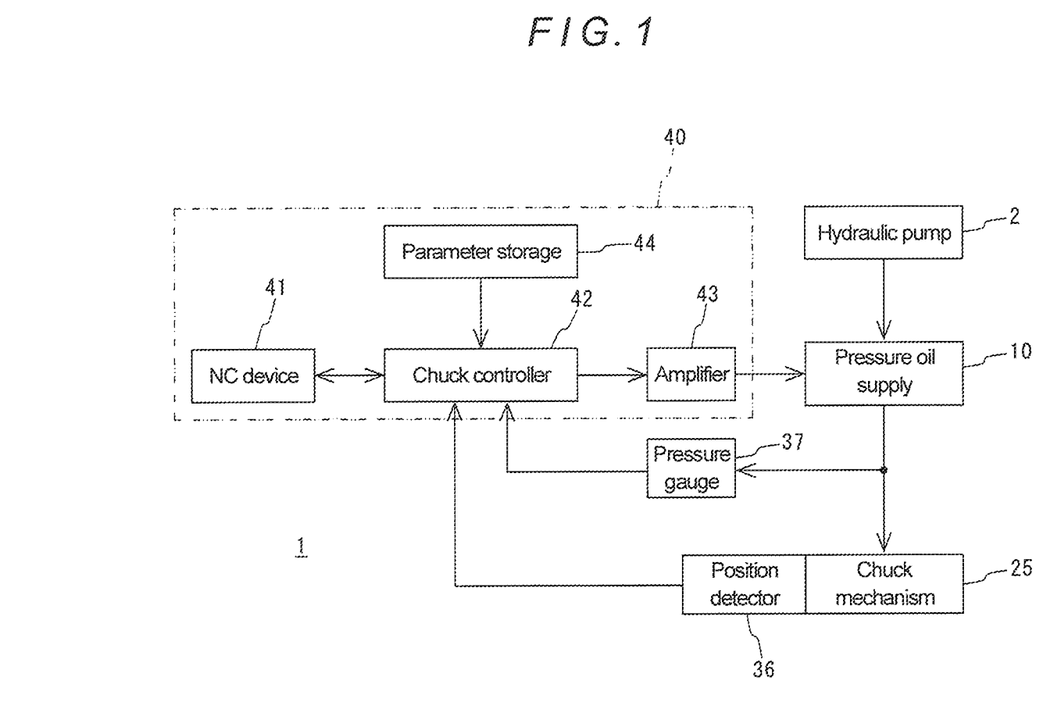
FIG. 1 is a block diagram showing a schematic configuration of a hydraulic chuck device according to an embodiment of the present disclosure.
Figure 2:
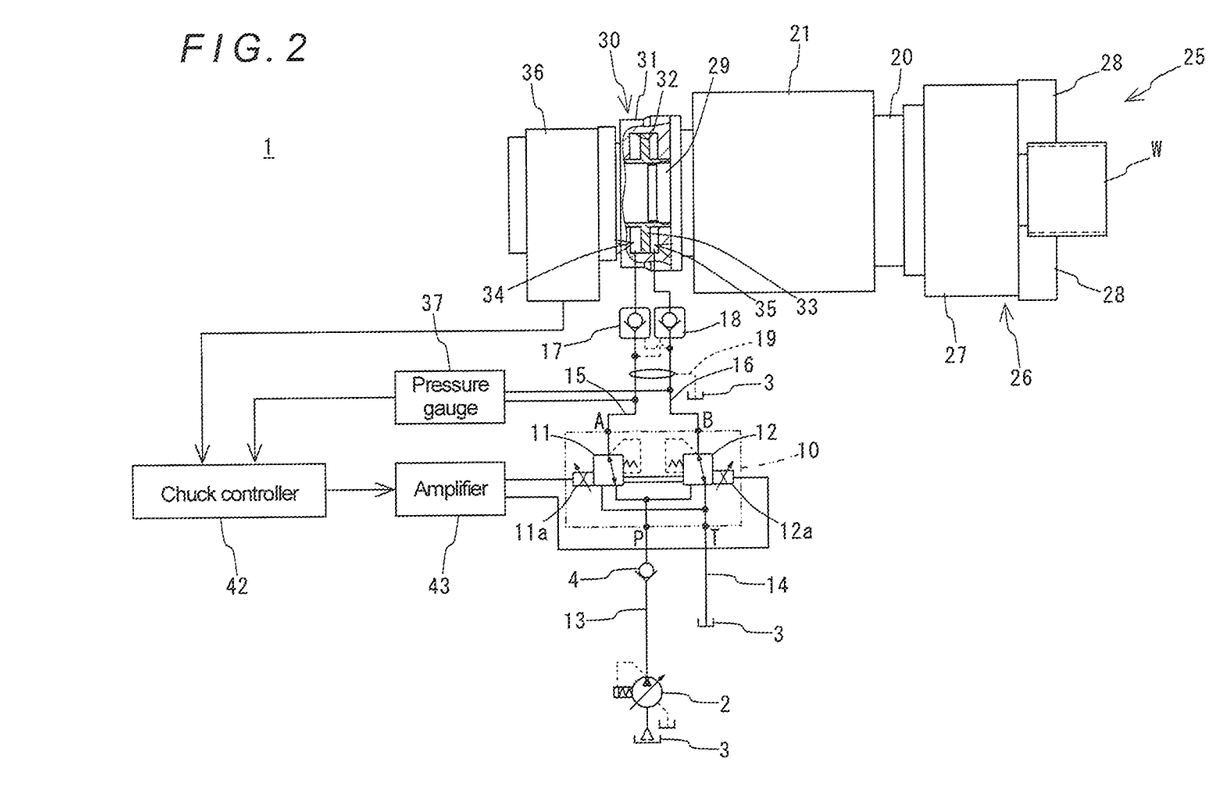
FIG. 2 is an illustration mainly showing specific configurations of a chuck mechanism and a pressure oil supply in the hydraulic chuck device shown in FIG. 1.

A specific embodiment of the present disclosure will be described below with reference to the drawings. As shown in FIGS. 1 and 2, a hydraulic chuck device 1 according to this embodiment is composed of a hydraulic pump 2, a tank 3, a pressure oil supply 10, a chuck mechanism 25, a pressure gauge 37, a controller 40, and other components. The controller 40 includes an NC device 41, a chuck controller 42, an amplifier 43, and a parameter storage 44. Note that the NC device 41 and the chuck controller 42 are each composed of a computer including a CPU, an ROM, an RAM, and other components, and their functions, which are described later, are achieved by computer programs. Further, the parameter storage 44 is composed of an appropriate storage medium, such as an RAM or the like.

The chuck mechanism 25 is composed of a chuck 26 attached to a front end surface of a spindle 20 of a lathe, a rotary cylinder 30 connected to the rear side of the spindle 20, a draw tube 29 connecting the chuck 26 and the rotary cylinder 30, and a position detector 36 connected to the rear side of the rotary cylinder 30. Note that the spindle 20 is rotatably held by a headstock (not shown) and is rotated about an axis thereof by a spindle motor 21.

The rotary cylinder 30 has a cylinder hole 32 and includes a housing 31 connected to the rear side of the spindle 20 and a piston 33 disposed in the cylinder hole 32. The cylinder hole 32 has a cylinder chamber for pushing 34 located on the rear side of the piston 33 and a cylinder chamber for drawing 35 located on the front side of the piston 33. Pressure oil from the pressure oil supply 10 is selectively supplied either into the cylinder chamber for pushing 34 or into the cylinder chamber for drawing 35. Note that the rotary cylinder 30 rotates together with the spindle 20; FIG. 2 schematically depicts the rotary cylinder 30, and pressure oil actually can be supplied into the cylinder chamber for pushing 34 or the cylinder chamber for drawing 35 in the rotating housing 31 through appropriate means.

Further, the chuck 26 includes a cylindrical body 27, a plurality of jaw bodies 28 disposed on the body 27 and arranged radially with respect to a center axis of the body 27, and an engaging body (not shown) disposed in the body 27 in engagement with the jaw bodies 28 and moved in the direction along the center axis of the body 27; the movement of the engaging body (not shown) moves the plurality of jaw bodies 28 in the radial direction to open or close the plurality of jaw bodies 28. Further, the draw tube 29 is connected at the front end thereof to the engaging body (not shown) and is connected at the rear end thereof to the piston 33.

The position detector 36 includes a body to be detected (not shown) and first, second, and third detection sensors (not shown), the body to be detected being connected to the rear end of the piston 33 and moving together with the piston 33, and the first, second, and third detection sensors being disposed along the moving path of the body to be detected (not shown) for detecting the body to be detected. The first detection sensor is disposed at a position at which it can detect the body to be detected (not shown) when the jaw bodies 28 are positioned at an unclamping position. Further, the second sensor is disposed at a position at which it can detect the body to be detected (not shown) when the jaw bodies 28 are positioned at a preliminary position in the course of their movement from the unclamping position to a clamping position, the preliminary position being situated before the clamping position. Furthermore, the third detection sensor is disposed at a position at which it can detect the body to be detected (not shown) when the jaw bodies 28 are positioned at the clamping position. Detections signals of the first, second, and third detection sensors (not shown) are transmitted to the chuck controller 42.

Note that, in this example, as shown in FIG. 2, the outer periphery of a hollow cylindrical workpiece W is clamped by the jaw bodies 28; supplying pressure oil from the pressure oil supply 10 into the cylinder chamber for pushing 34 causes the jaw bodies 28 to carry out an unclamping operation, and supplying pressure oil from the pressure oil supply 10 into the cylinder chamber for drawing 35 causes the jaw bodies 28 to carry out a clamping operation.

The tank 3 stores therein an appropriate amount of working oil and the hydraulic pump 2 increases the pressure of the working oil stored in the tank 3 to a predetermined pressure and then discharges it into a supply pipe 13. The supply pipe 13 has a check valve 4 disposed intermediately therein, and is connected at one end thereof to a discharge portion of the hydraulic pump 2 and is connected at the other end thereof to the pressure oil supply 10.

The pressure oil supply 10 is composed of a pair of solenoid proportional pressure control valves 11 and 12. The solenoid proportional pressure control valves 11 and 12 are put together as if to function as one control valve; however, they actually function independently from each other in accordance with their respective operation signals. The other end of the supply pipe 13 is connected to a port P of the pressure oil supply 10, the port P being connected to inlet ports of the solenoid proportional pressure control valves 11 and 12. A return pipe 14, which is connected at one end thereof to the tank 3, is connected at the other end thereof to a port T of the pressure oil supply 10, the port T being connected to drain ports of the solenoid proportional pressure control valves 11 and 12.

The opening degree of each of the solenoid proportional pressure control valves 11 and 12 is proportionally controlled in accordance with a control signal (current or voltage) input into a solenoid 11a, 12a thereof, whereby pressure oil supplied thereto from the hydraulic pump 2 through the supply pipe 13 is set at a predetermined pressure corresponding to the control signal and then discharged from a discharge port A, B thereof. Note that the discharge port A of the solenoid proportional pressure control valve 11 is connected to one end of a supply pipe 15, the other end of the supply pipe 15 being connected to the cylinder chamber for pushing 34. Further, the discharge port B of the solenoid proportional pressure control valve 12 is connected to one end of a supply pipe 16, the other end of the supply pipe 16 being connected to the cylinder chamber for drawing 35.

Further, each of the solenoid proportional pressure control valves 11 and 12 is configured to be pilot-operated by the pressure of the pressure oil within the supply pipe 15, 16 being fed back as a pilot pressure thereto. Accordingly, for example, when a control signal is transmitted to the solenoid proportional pressure control valve 11 and thereby the solenoid proportional pressure control valve 11 is energized, the solenoid proportional pressure control valve 11 discharges pressure oil set at a pressure corresponding to the received control signal into the supply pipe 15, and simultaneously the solenoid proportional pressure control valve 12 is de-energized and thereby the working oil within the supply pipe 16 is returned to the tank 3 through the return pipe 14. On the other hand, when a control signal is transmitted to the solenoid proportional pressure control valve 12 and thereby the solenoid proportional pressure control valve 12 is energized, the solenoid proportional pressure control valve 12 discharges pressure oil set at a pressure corresponding to the received control signal into the supply pipe 16, and simultaneously the solenoid proportional pressure control valve 11 is de-energized and thereby the working oil within the supply pipe 15 is returned to the tank 3 through the return pipe 14.

Further, the supply pipes 15 and 16 have pilot-operated check valves 17 and 18 disposed intermediately therein, respectively. The pilot-operated check valve 17 is configured to open a valve by receiving a pilot pressure from the supply pipe 16, and the pilot-operated check valve 18 is configured to open a valve by receiving a pilot pressure from the supply pipe 15. Accordingly, the pilot-operated check valves 17 and 18 maintain the pressures in the cylinder chamber for pushing 34 and cylinder chamber for drawing 35 so as to maintain equilibrium between them. Further, the pilot-operated check valves 17 and 18 enable a rapid emergency stop and allow the working oils within the cylinder chamber for pushing 34 and cylinder chamber for drawing 35 to be drained therefrom.

The pressure gauge 37 is connected to the supply pipes 15 and 16 for detecting the pressures of the pressure oils within the supply pipes 15 and 16, and transmits signals relating to the detected pressures to the chuck controller 42. Further, reference numeral 19 in FIG. 2 indicates a fluid returning pipe, which functions to return working oil leaking from a rotational sliding portion of the rotary cylinder 30 to the tank 3.

As described above, the controller 40 includes the NC device 41, the chuck controller 42, the amplifier 43, and the parameter storage 44. The NC device 41 is a functional unit that numerically controls the lathe, and, in this embodiment, commands relating to clamping and unclamping in the chuck mechanism 25 are transmitted from the NC device 41 to the chuck controller 42.

The parameter storage 44 is a functional unit that stores therein, in the form of a data table, the relationship between the magnitude of the current supplied as a control signal to the solenoid proportional pressure control valves 11 and 12 (current command) and the pressure of the pressure oil discharged from the discharge ports A and B after being adjusted by the solenoid proportional pressure control valves 11 and 12 based on the value of the currents. For example, the relationship between the pressure and the current command is stored in the form of a data table with increments of 0.1 Mpa in the parameter storage 44.

Further, in the parameter storage 44, a first pressure and a current command corresponding thereto (first current command), a second pressure and a current command corresponding thereto (second current command), and a third pressure and a current command corresponding thereto (third current command) are set and stored. The first, second, and third pressures are externally input through an appropriate input device, and the first, second, and third current commands corresponding to the first, second, and third pressures are set based on the data table.

In moving the jaw bodies 28 from the unclamping position to the clamping position, the first pressure is used to move the jaw bodies 28 at a high speed from the unclamping position to the preliminary position situated before the clamping position, the first pressure being determined as appropriate taking into account the performance and pressure resistance of the rotary cylinder 30 and solenoid proportional pressure control valves 11 and 12, and the like. Further, the first pressure is also used to move the jaw bodies 28 from the clamping position to the unclamping position.

The second pressure is lower than the first pressure and is used to move the jaw bodies 28 at a low speed from the preliminary position to the clamping position. The second pressure is empirically determined so that, when the jaw bodies 28 are caused to clamp the workpiece W, the clamping operation of the jaw bodies 28 does not become unstable. The third pressure is used to clamp the workpiece W with an appropriate clamping force with the jaw bodies 28 after moving the jaw bodies 28 to the clamping position, the third pressure being determined based on the rigidity of the workpiece W. Note that the third pressure may be equal to the second pressure.

The chuck controller 42 reads out the first current command, the second current command, or the third current command stored in the parameter storage 44 and transmits the read-out first, second, or third current command to the amplifier 43. The amplifier 43 supplies a current corresponding to the received current command to the pressure oil supply 10.

Figure 3:
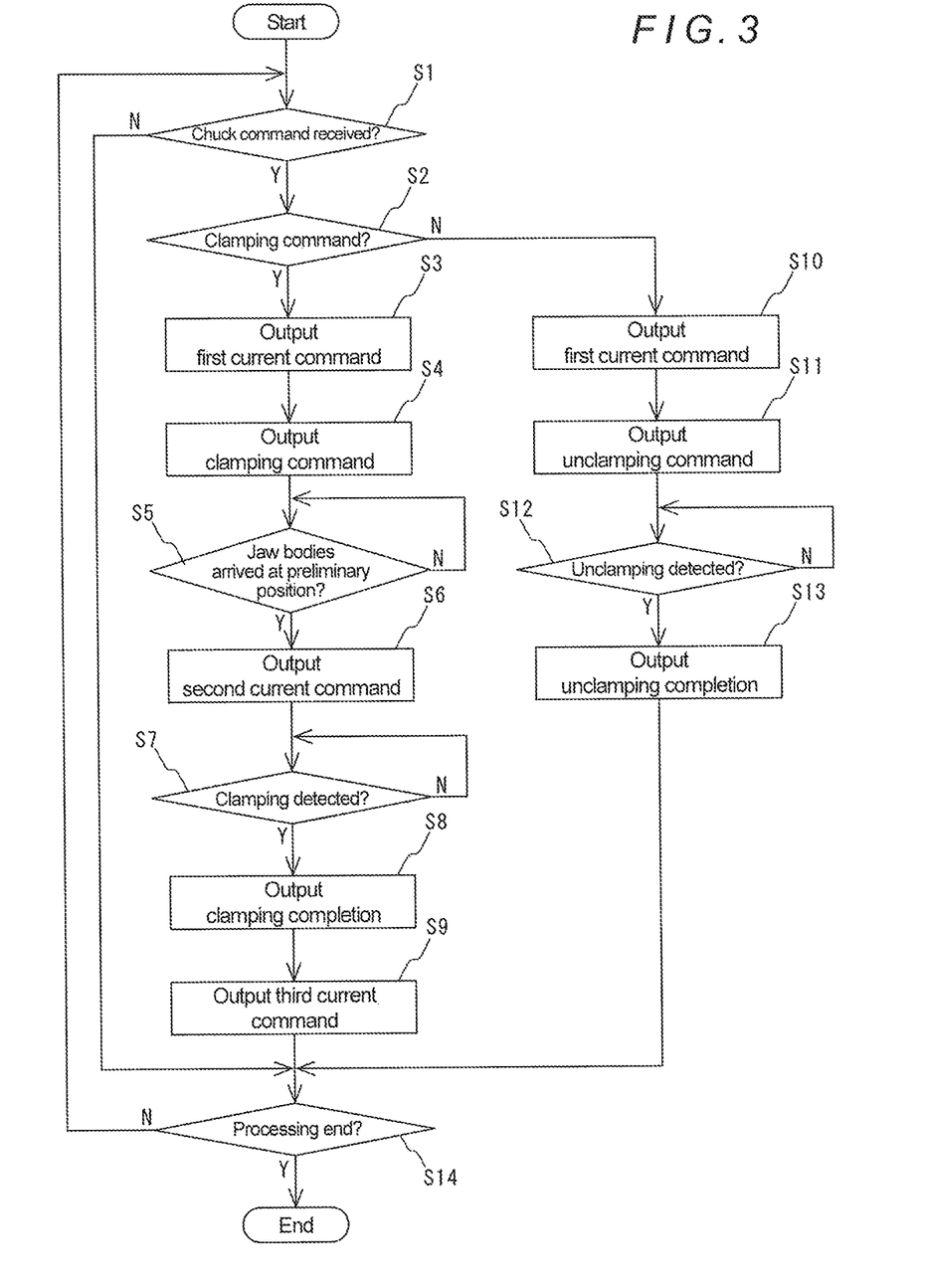
FIG. 3 is a flowchart showing a processing procedure in a chuck controller in the embodiment.

Specifically, the chuck controller 42 carries out the processing shown in FIG. 3. That is, after starting the processing, the chuck controller 42 stands by until receipt of a command relating to operation of the chuck mechanism 25 from the NC device 41. Upon receiving a command relating to operation of the chuck mechanism 25 from the NC device 41 (step S1), in the case where the received command is an unclamping command, the chuck controller 42 reads out the first current command from the parameter storage 44 and transmits the first current command to the amplifier 43 (step S10), and also transmits the unclamping command to the amplifier 43 (step S11). Upon receiving the first current command and the unclamping command, the amplifier 43 supplies a current corresponding to the first current command to the solenoid 11a of the solenoid proportional pressure control valve 11 and prevents the solenoid 12a of the solenoid proportional pressure control valve 12 from being supplied with current.

Thereby, the solenoid 11a is energized, and the pressure of the pressure oil supplied from the pump 2 is adjusted to the first pressure, which corresponds to the current suppled to the solenoid 11a, by the solenoid proportional pressure control valve 11 and the pressure oil thus adjusted to the first pressure is supplied into the cylinder chamber for pushing 34 through the supply pipe 15 and the pilot-operated check valve 17. Note that the pressure of the pressure oil discharged from the solenoid proportional pressure control valve 11 is detected by the pressure gauge 37 connected to the supply pipe 15, and the chuck controller 42 performs PID control on the solenoid proportional pressure control valve 11 based on the pressure detected by the pressure gauge 37 so that the pressure of the pressure oil adjusted by the solenoid proportional pressure control valve 11 becomes a determined pressure.

Meanwhile, the solenoid 12a of the solenoid proportional pressure control valve 12 is in a de-energized state; therefore, the working oil within the cylinder chamber for drawing 35 is returned to the tank 3 through the supply pipe 16, the pilot-operated check valve 18, the solenoid proportional pressure control valve 12, and the return pipe 14.

Figure 4:
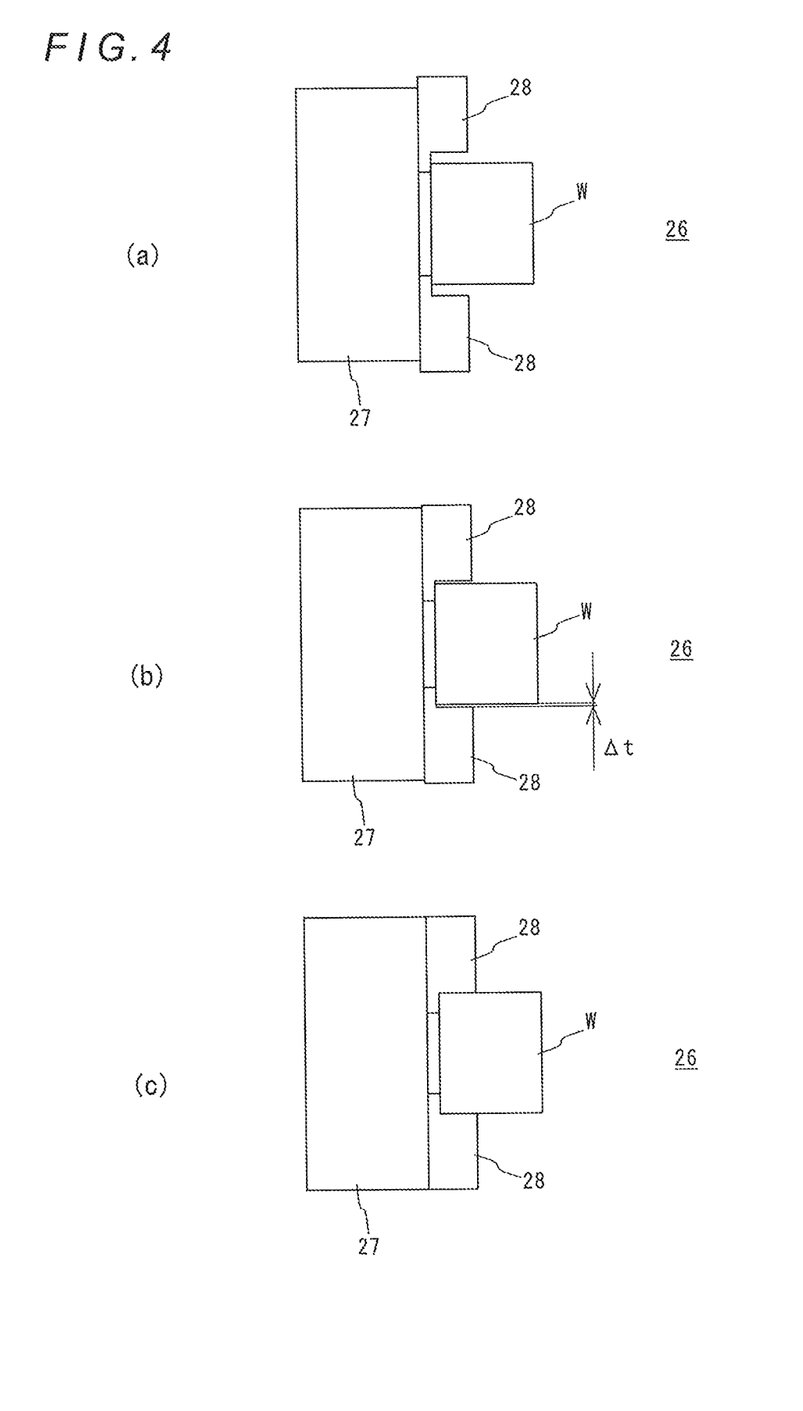
FIG. 4 is an illustration for explaining operation of a chuck in the embodiment.

Accordingly, the piston 33 is moved toward the chuck 26 side (forward) by the pressure oil supplied into the cylinder chamber for pushing 34, which causes the jaw bodies 28 to carry out the unclamping operation (in this example, an opening operation) via the draw tube 29 and the engaging body (not shown). FIG. 4(a) shows a state where the jaw bodies 28 have unclamped the workpiece W. Note that, as described above, the first pressure is for moving the jaw bodies 28 at a high speed and therefore the jaw bodies 28 carry out the unclamping operation quickly.

Further, the chuck controller 42 checks a detection signal input from the position detector 36 (step S12). After verifying that the jaw bodies 28 have arrived at the unclamping position, the chuck controller 42 transmits an unclamping completion signal to the NC device 41 (step S13) and then proceeds to step S14.

On the other hand, in the case where the command received from the NC device 41 is a clamping command, the chuck controller 42 reads out the first current command from the parameter storage 44 and transmits the first current command to the amplifier 43 (step S3), and also transmits the clamping command to the amplifier 43 (step S4). Upon receiving the first current command and the clamping command, the amplifier 43 supplies a current corresponding to the first current command to the solenoid 12a of the solenoid proportional pressure control valve 12 and prevents the solenoid 11a of the solenoid proportional pressure control valve 11 from being supplied with current. Thereby, the solenoid 12a is energized, and the pressure of the pressure oil supplied from the pump 2 is adjusted to the first pressure, which corresponds to the current supplied to the solenoid 12a, by the solenoid proportional pressure control valve 12 and the adjusted pressure oil is supplied into the cylinder chamber for drawing 35 through the supply pipe 16 and the pilot-operated check valve 18.

Note that the pressure of the pressure oil discharged from the solenoid proportional pressure control valve 12 is detected by the pressure gauge 37 connected to the supply pipe 16 and the chuck controller 42 performs PID control on the solenoid proportional pressure control valve 12 based on the pressure detected by the pressure gauge 37 so that the pressure of the pressure oil adjusted by the solenoid proportional pressure control valve 12 becomes a determined pressure.

Meanwhile, the solenoid 11a of the solenoid proportional pressure control valve 11 is in a de-energized state; therefore, the working oil within the cylinder chamber for pushing 34 is returned to the tank 3 through the supply pipe 15, the pilot-operated check valve 17, the solenoid proportional pressure control valve 11, and the return pipe 14.

Accordingly, the piston 33 is moved backward by the pressure oil supplied into the cylinder chamber for drawing 35, which causes the jaw bodies 28 to carry out the clamping operation (in this example, a closing operation) via the draw tube 29 and the engaging body (not shown). Note that, as described above, the first pressure is for moving the jaw bodies 28 at a high speed and therefore the jaw bodies 28 carry out the clamping operation quickly. Further, this quick clamping operation is performed until the jaw bodies 28 arrive at the preliminary position (step S5). FIG. 4(b) shows a state where the jaw bodies 28 have arrived at the preliminary position. The preliminary position is, as described above, situated before the clamping position at which the jaw bodies 28 clamp the workpiece W, and the jaw bodies 28 at the preliminary position have a clearance Δt between their respective clamping surfaces and a clamped surface of the workpiece W. The clearance At is determined empirically so that the jaw bodies 28 can stably clamp the workpiece W.

After the jaw bodies 28 arrive at the preliminary position and this arrival is detected by the position detector 36 (step S5), the chuck controller 42 then reads out the second current command from the parameter storage 44 and transmits the second current command to the amplifier 43 (step S6). Upon receiving the second current command, the amplifier 43 supplies a current corresponding to the second current command to the solenoid 12a of the solenoid proportional pressure control valve 12. Thereby, the pressure of the pressure oil supplied from the solenoid proportional pressure control valve 12 into the cylinder chamber for drawing 35 is adjusted to the second pressure that corresponds to the current supplied to the solenoid 12a.

As described above, the second pressure is lower than the first pressure and is used to move the jaw bodies 28 at a low speed from the preliminary position to the clamping position. Therefore, the jaw bodies 28 move at a low speed from the preliminary position to the clamping position at which they clamp the workpiece W. FIG. 4(c) shows a state where the jaw bodies 28 have arrived at the clamping position and are clamping the workpiece W.

After the jaw bodies 28 arrive at the clamping position and this arrival is detected by the position detector 36 (step S7), the chuck controller 42 transmits a clamping completion signal to the NC device 41 (step S8). Thereafter, the chuck controller 42 reads out the third current command from the parameter storage 44 and transmits the third current command to the amplifier 43 (step S9). Upon receiving the third current command, the amplifier 43 supplies a current corresponding to the third current command to the solenoid 12a of the solenoid proportional pressure control valve 12. Thereby, the pressure of the pressure oil supplied from the solenoid proportional pressure control valve 12 into the cylinder chamber for drawing 35 is adjusted to the third pressure that corresponds to the current supplied to the solenoid 12a. As described above, the third pressure is for clamping the workpiece W with an appropriate clamping force with the jaw bodies 28 after the jaw bodies 28 are moved to the clamping position.

After performing the steps S9 to S13, the chuck controller 42 repeatedly performs the above-described steps S1 to S13 until receipt of a processing end signal. Upon receiving a processing end signal, the chuck controller 42 ends the processing (step S14).

As described above, in the hydraulic chuck device 1 according to the present embodiment, when the chuck controller 42 controls the pressure oil supply 10 to execute the clamping operation in which the jaw bodies 28 are moved from the unclamping position to the clamping position, during movement of the jaw bodies 28 from the unclamping position to the preliminary position that is situated before the clamping position, pressure oil set at the first pressure is supplied into the cylinder chamber for clamping (in this example, the cylinder chamber for drawing 35) to move the jaw bodies 28 at a high speed. Thereafter, during movement of the jaw bodies 28 from the preliminary position to the clamping position, pressure oil set at the second pressure lower than the first pressure is supplied into the cylinder chamber for clamping (the cylinder chamber for drawing 35) to move the jaw bodies 28 at a low speed.

Thus, in this hydraulic chuck device 1, when the jaw bodies 28 is caused to carry out the clamping operation, the jaw bodies 28 are moved at a high speed during their movement from the unclamping position to the preliminary position; therefore, the clamping operation can be executed quickly even when a large clearance is set between the clamping surfaces of the jaw bodies 28 and the clamped surface of the workpiece W.

Further, the jaw bodies 28 are moved at a low speed during their movement from the preliminary position to the clamping position; therefore, the workpiece W can be stably clamped by the jaw bodies 28. Note that the moving distance from the preliminary position to the clamping position can be set to be very small by situating the preliminary position as appropriate; therefore, the clamping operation as a whole can be executed quickly even though the moving speed of the jaw bodies 28 for movement from the preliminary position to the clamping position is reduced.

Further, after the jaw bodies 28 completes the clamping operation, the workpiece W is clamped by the jaw bodies 28 using pressure oil set at the third pressure that is determined taking into account the rigidity of the workpiece W; therefore, the workpiece W can be clamped with a clamping force corresponding to the rigidity of the workpiece W and the like, which prevents occurrence of clamping distortion on the workpiece W.

Further, the pressures of pressure oil used for the clamping operation of the jaw bodies 28 (the first and second pressures) each can be set at a pressure different from the pressure of pressure oil used for clamping the workpiece W (the third pressure). Therefore, the clamping operation of the jaw bodies 28 can be optimized by setting the first and second pressures at optimal pressures as appropriate, and the clamping force for clamping the workpiece W can be optimized by setting the third pressure at an optimal pressure as appropriate. That is, both the clamping operation and the clamping force can be optimized.

One specific embodiment of the present disclosure has been described above; however, the present disclosure is not limited thereto and can be implemented in other modes.

For example, in the above embodiment, the position detector 36 detects arrival of the jaw bodies 28 at the preliminary position; however, the present disclosure is not limited thereto. For example, the chuck controller 42 may be configured to, when a predetermined time elapses after supply of pressure oil set at the first pressure into the cylinder chamber for drawing 35 is started by controlling the solenoid proportional pressure control valve 12, determine that the jaw bodies 28 arrive at the preliminary position, and start supply of pressure oil set at the second pressure into the cylinder chamber for drawing 35. The jaw bodies 28 move at a constant speed that depends on the pressure of the pressure oil supplied into the cylinder chamber for drawing 35; therefore, it is possible to determine that the jaw bodies 28 arrive at the preliminary position when a predetermined time elapses after supply of pressure oil set at the first pressure into the cylinder chamber for drawing 35 is started.

Further, the pressure oil supply 10 is composed of the pair of solenoid proportional pressure control valves 11 and 12 and the solenoid proportional pressure control valves 11 and 12 are put together as if to function as one control valve; however, the pressure oil supply 10 is not limited to such a configuration. The pressure oil supply 10 may be composed of a combination of a solenoid switching valve that switches between the cylinder chamber for pushing 34 and the cylinder chamber for drawing 35 to supply pressure oil therein and one solenoid proportional pressure control valve that proportionally controls pressure oil discharged from the hydraulic pump 2 relative to a control signal, thereby adjusting the pressure oil to a pressure corresponding to the control signal and supplying the adjusted pressure oil to the solenoid switching valve. This configuration can provide the same function as the above-described pressure oil supply 10.

Further, in the above example, the outer periphery of the workpiece W is clamped by the jaw bodies 28; however, as a matter of course, the clamping manner of the jaw bodies 28 is not limited thereto. The inner periphery of the workpiece W may be clamped by the jaw bodies 28. In this case, the workpiece W is clamped by supplying pressure oil into the cylinder chamber for pushing 34, and the workpiece W is unclamped by supplying pressure oil into the cylinder chamber for drawing 35.

Further, the moving manner of the jaw bodies 28 when the jaw bodies 28 are caused to carry out the clamping operation, in which the jaw bodies 28 are moved at a high speed to the preliminary position situated before the clamping position and then are moved at a low speed to the clamping position, can be applied to a tailstock and a center rest, which are also provided on a lathe. For example, in the case of a tailstock, when an operation of pushing a tailstock spindle against a workpiece is performed, the tailstock spindle is moved at a high speed to a preliminary position situated before a position at which the tailstock spindle is brought into contact with the workpiece, and then the tailstock spindle is moved at a low speed to be brought into contact with the workpiece. Further, in the case of a center rest, when an operation of clamping a workpiece between two arms is performed, the arms are moved at a high speed to a preliminary position situated before a position at which the arms clamp the workpiece therebetween, and then the arms are moved at a low speed to clamp the workpiece therebetween. Such operations also can reduce their respective operation times.

What is claimed is:

1. A hydraulic chuck device comprising:
   a cylinder portion having a cylinder hole and a piston disposed in the cylinder hole, the piston being operated by pressure oil selectively supplied into either one of two cylinder chambers formed on opposite sides of the piston;
   a chuck having a plurality of jaw portions connected to the piston, the plurality of jaw portions being simultaneously moved in a radial direction by operation of the piston so as to be opened and closed;
   a pressure oil supply switching the cylinder chamber to be supplied with pressure oil to open or close the plurality of jaw portions and controlling pressure of the pressure oil to be supplied; and
   a controller controlling the pressure oil supply,
   the controller being configured to,
      when controlling the pressure oil supply to supply pressure oil into the cylinder chamber for clamping for executing a clamping operation of moving the plurality of jaw portions from an unclamping position to a clamping position for clamping a workpiece,
      during movement of the plurality of jaw portions from the unclamping position to a preliminary position situated before the clamping position, control the pressure oil supply based on a first control signal to supply pressure oil set at a first pressure into the cylinder chamber for clamping so as to move the plurality of jaw portions at a constant high speed,
      during movement of the plurality of jaw portions from the preliminary position to the clamping position, control the pressure oil supply based on a second control signal to supply pressure oil set at a second pressure lower than the first pressure into the cylinder chamber for clamping so as to move the plurality of jaw portions to the clamping position at a non-zero low speed, and after the plurality of jaw portions arrive at the clamping position, control the pressure oil supply based on a third control signal to supply pressure oil set at a third pressure different from the second pressure and set as a pressure for clamping into the cylinder chamber for clamping, thereby causing the plurality of jaw portions to clamp the workpiece with a clamping force corresponding to the third pressure.

2. The hydraulic chuck device according to claim 1, wherein:

the hydraulic chuck device further comprises a position detector detecting arrival of the plurality of jaw portions at the preliminary position; and the controller is configured to, when arrival of the plurality of jaw portions at the preliminary position is detected by the position detector, control the pressure oil supply to supply pressure oil set at the second pressure into the cylinder chamber for clamping.

3. The hydraulic chuck device according to claim 2, wherein:

the pressure oil supply comprises a solenoid switching valve switching the cylinder chamber to be supplied with pressure oil, and a solenoid proportional pressure control valve controlling the pressure of the pressure oil to be supplied; and the controller is configured to control the solenoid switching valve to switch the cylinder chamber to be supplied with pressure oil, and control the solenoid proportional pressure control valve to control the pressure of the pressure oil to be supplied.

4. The hydraulic chuck device according to claim 1, wherein the controller is configured to, when a predetermined time elapses after supply of pressure oil set at the first pressure into the cylinder chamber for clamping is started, determine that the plurality of jaw portions arrive at the preliminary position, and supply pressure oil set at the second pressure into the cylinder chamber for clamping.

5. The hydraulic chuck device according to claim 4, wherein:

the pressure oil supply comprises a solenoid switching valve switching the cylinder chamber to be supplied with pressure oil, and a solenoid proportional pressure control valve controlling the pressure of the pressure oil to be supplied; and the controller is configured to control the solenoid switching valve to switch the cylinder chamber to be supplied with pressure oil, and control the solenoid proportional pressure control valve to control the pressure of the pressure oil to be supplied.

6. The hydraulic chuck device according to claim 1, wherein:

the pressure oil supply comprises a solenoid switching valve switching the cylinder chamber to be supplied with pressure oil, and a solenoid proportional pressure control valve controlling the pressure of the pressure oil to be supplied; and the controller is configured to control the solenoid switching valve to switch the cylinder chamber to be supplied with pressure oil, and control the solenoid proportional pressure control valve to control the pressure of the pressure oil to be supplied.

* * * * *